United States Patent

[11] 3,633,437

[72] Inventor Takuo Ishida
c/o Shimano Industrial Co. Ltd., No. 77, 3-cho, Oimatsu-cho, Sakai, Osaka, Japan
[21] Appl. No. 867,213
[22] Filed Oct. 17, 1969
[45] Patented Jan. 11, 1972
[32] Priority July 31, 1969
[33] Japan
[31] 44/73184

[54] HAND CONTROL DEVICE FOR SPEED CHANGE GEAR MECHANISM OF A BICYCLE
5 Claims, 6 Drawing Figs.

[52] U.S. Cl. .................................................. 74/489, 74/501 R
[51] Int. Cl. ...................................................... G05g 7/02
[50] Field of Search ............................................ 74/501, 505, 551.8, 551.9, 488, 489

[56] References Cited
UNITED STATES PATENTS
3,524,979 8/1970 Cohen ........................... 74/489 X
862,815 8/1907 Fosnot ........................... 74/488
2,874,587 2/1959 Schmid .......................... 74/488 X
3,104,559 9/1963 Dotter ............................ 74/489
3,499,346 3/1970 Ishida ............................. 74/501

FOREIGN PATENTS
837,812 1949 Germany ....................... 74/489
471,278 1925 France .......................... 74/501
F15,926II 5/1956 Germany ....................... 74/489

Primary Examiner—Milton Kaufman
Attorney—McGlew and Toren

ABSTRACT: A hand control device for the speed change gear mechanism of a bicycle comprising a drive means mounted rotatably around a handle rod in the proximity of the grip of this rod, a driven means being rotatable along with the movement of said drive means provided with an operable wire which is connected in its one end with the speed change gear and connected in its other end with said driven means so that said driven means is moved by the movement of said drive means to operate the gearshift for changing the speed whereby a rider can control the speed easily and safely with the fingertip of his hand grasping the handle grip.

PATENTED JAN 11 1972

INVENTOR.
TAKUO ISHIDA

ATTORNEYS

HAND CONTROL DEVICE FOR SPEED CHANGE GEAR MECHANISM OF A BICYCLE

This invention relates in general to a band control device for a speed change gear mechanism of a bicycle and more in particular to improvements in such a device adapted substantially to be manipulated just in the proximity of a bicycle handle grip in order to control the multiple speed transmissions.

In recent years increased use has been made of such a speed change gear mechanism that it is possible to shift the gear in a three-speed or five-speed bicycle transmission, and, in order to catch up with general user's preference for this type of the mechanism, a good many novel and improved bicycle speed change gear mechanisms have so far been progressively invented and publicly proposed; for example among many others, there is a type of the mechanism wherein the handle lever is rotatably mounted on the top tube or the like of the bicycle; and also there is another type of the mechanism wherein the handle grip is mounted rotatably with respect to the handle lever. However, the above-mentioned conventional types of the speed change gear mechanisms are fatally destined to such disadvantages and deficiencies that, when the former is applied to the bicycle, the speed change gear mechanism must be positioned apart from the handle grip so that a rider has to release his grasp of the handle grip each time he intends to shift the speed of the bicycle; and, due to this inconvenience, especially an unexperienced rider cannot but expose himself to great dangers; and when the latter is applied to the bicycle, the handle grip is mounted freely rotatable with respect to the handle lever so that a rider has to incessantly keep on grasping the handle grip as long as the bicycle is running. Consequently it follows that the speed change gear mechanism may often work to change the speed of the bicycle whimsically into an undesirable rate thereof against the rider's own will because the handle grip is liable to be moved unexpectedly for instance partly due to the frequent vibrations transmitted by the running bicycle and partly due to the momentary shocks caused by braking operations. Furthermore, the conventional structurally defective in that they are inevitable limited in the shape and size of the handle grip, thereby making it impossible to construct them into a better form than the existing ones so that they result in forcing a rider to consume unduly great energy for manipulating the handle grip to ensure the desirable rate of the bicycle speed.

Therefore it is one of the principal objects of this invention to provide such a speed change gear mechanism that a rider can safety manipulate for shifting the speed of a bicycle while grasping the handle grip and at the same time he can operate this manual gearshift operation in order to avoid any unexpected change in the speed. It is another object of the invention to provide a speed change gear mechanism wherein a rider can easily operate the gearshift by consuming a slight energy for grasping the handle grip. Further it is another object of the invention to provide a speed change gear mechanism having the indicating means at which a rider can easily look to confirm the changed rate of the speed at any time when he has shifted the speed change gear. Accordingly, it is to be noted that the characteristics of the present invention reside in that the mechanism comprises a driving means rotatably mounted close to the handle grip of the bicycle and a driven means which engages with said driving means to operate a wire connected to the speed change gear by the driving operation of said driving means whereby the speed change gear is operated to shift the speed of a bicycle into any desirable rate thereof.

Reference will be hereinafter made to the accompanying drawings for the purpose of describing in detail some embodiments executed in accordance with the present invention, in which.

Figure 1:
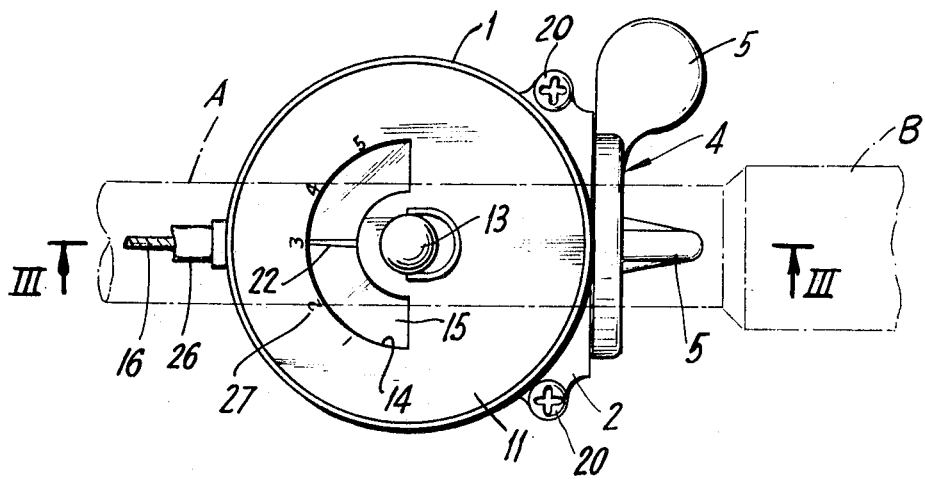
FIG. 1 is a plan view partially showing the principal elements of the invention.
Figure 2:
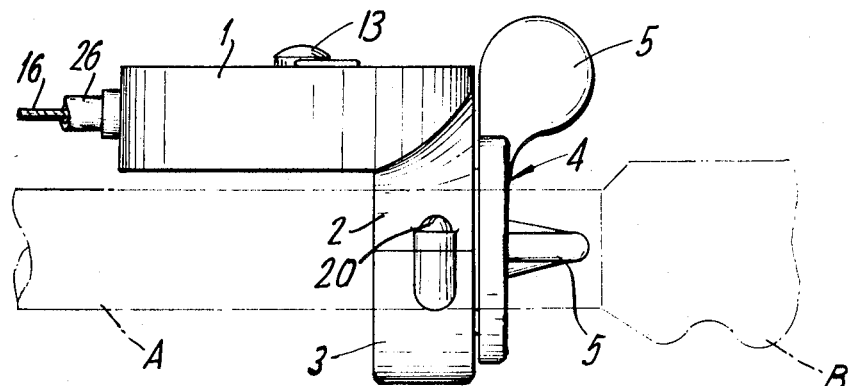
FIG. 2 is a side elevational view thereof.
Figure 5:
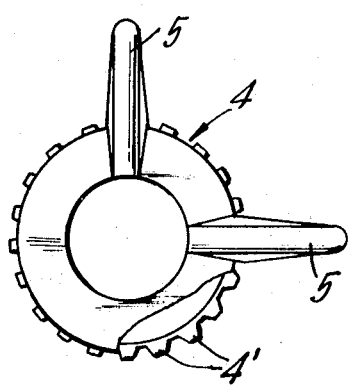
FIG. 5 is an elevational section view partially showing rotatable driving means.
Figure 6:
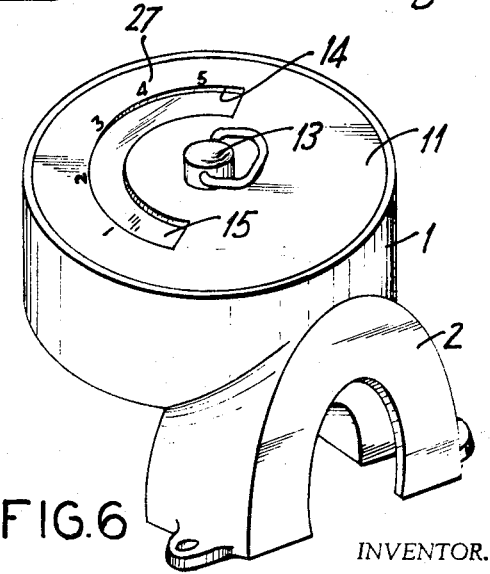
FIG. 6 is perspective view partially showing the casing of said principal elements.
Figure 3:
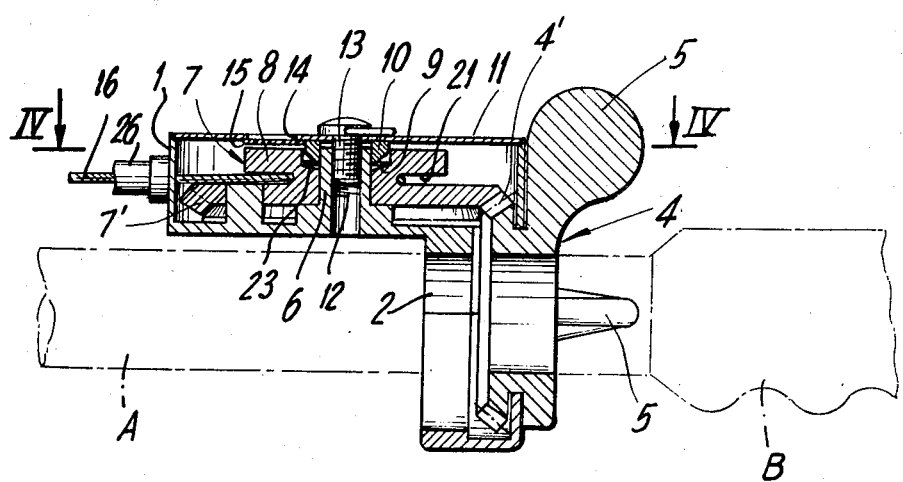
FIG. 3 is a cross section view taken along the line III—III of FIG. 1.
Figure 4:
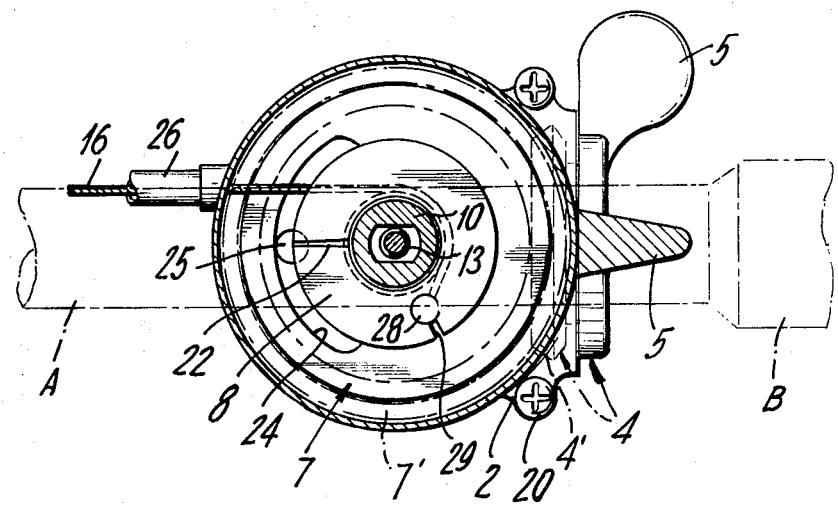
FIG. 4 is a cross section view taken along the line IV—IV of FIG. 3.

Referring now more particularly to the drawings, a handle rod A is arranged for mounting the mechanism of the present invention and rigidly secured to the end of this rod A is a handle grip B. Reference numeral 1 designates a bottom casing of cylindrical shape and on one side thereof is fixed a handle rod holder 2 whose inner peripheral rim is made into arc form having equal radii so as to be exactly shaped to the outer peripheral rim of said handle rod A. This holder 2 has a semidoughnutlike shape and looks like a channel type when taken away longitudinally in section. The inner space surrounded by said channel-typed walls is connected to said casing through the bottom thereof. The inner peripheral rim of a handle grip holder 3 countering to aforesaid holder 2 is also provided with an arciform rim which is exactly shaped to the outer peripheral rim of the handle rod A, and it also looks like a channel type when taken away longitudinally in section. Said casing 1 is secured to the handle rod A by mounting thereon these holders 2 and 3 through each of the arciform walls thereof so that the terminals of these walls are fixedly jointed together. The rigid fixation of said holders 2 and 3 is made possible, as is definitely shown in the FIG. 2, by providing a threaded hole on the holder 2 and sustaining a screw 20 in the holder 3 so that this screw 20 is jointed to the hole through the threaded portion thereof. A driving means 4 which is rotatable about the handle rod A is positioned within the chambers of said holders 2 and 3. The outer periphery of this driving means 4 is provided with the teeth 4' of a cogwheel, a part of which being protruded from the bottom of said casing 1. On the side of the handle grip B is provided a knob for rotatably operating the driving means 4. However, it is also possible to expose a part of this knob 5 outwardly of the holder 2 whereby to rotate the knob 5 along the outer periphery of this holder 2. By the knob, as it is called in this specification, is meant in a general sense such an element that can rotatably operated the driving means 4 and there is not a special and concrete form within the limit of which to define the structure of the knob. A driven element 7 is rotatably held on a longitudinal shaft 6 provided almost in the intermediate portion of the casing 1. Around the outer periphery of this element 7 are formed the cogwheel teeth 7' engageable with said cogwheel teeth 4.' Further said element 7 is provided with a disc plate 8 and an annular channel 21 for holding an inner wire guided through the sidewall of the casing 1. On said disc plate 8 is marked an arrow 22. A cover plate 11 for covering the upper opening portion of the casing 1 has an arciform aperture 14 and a hole perforated through the middle portion of this plate 11. In said perforated hole is inserted a bolt 13 while said aperture 14 is covered with a transparent glass sheet 15 or a transparent plastic sheet. Along this aperture 14 are, at regular intervals, marked numerals and other signs 27 for indicating each speed shift of the speed change gear mechanism. Said longitudinal shaft 6 being hollow, its inside is provided with a threaded portion 12 into which said setbolt 13 is screwed. Together with a pusher 10, a plate spring 9 sleeved on the longitudinal shaft 6 is positioned in the recessed portion 23 provided in the center of the disc plate 8 and including a tapered bottom. Subject to the tightening condition of said setbolt 13 it is possible to give a desired frictional resistance to said element 7 through means of this plate spring 9. Due to this, the element 7 is moved by the desired degree of an angle. Accordingly when the element 7 is moved by the desired degree of an angle in order to shift the speed of the bicycle, it is held stationary in the position to which it has been just moved. Aside from the above-mentioned device to which the plate spring 9 is applied for the purpose of holding the element 7 stationary in a desired position, it is also possible to employ such a device that is composed of both balls pressed by a spring and notches having the same number as these balls. In case the plate spring 9 is applied to this invention as is illustrated in the drawing, the advantage is brought about that the rotation of the element 7 caused by the driving means 4 is favorably adjusted in proportions to the fixed position where the element 7 is held stationary, since it is possible to adjustably change the frictional resistance of the driven means 4 caused by the plate spring 9 due to the availability of free adjustment of the condition where the setbolt 13 is screwed. In order that the driven means 7 is rotated at the angle not exceeding the desired degrees which are in proportion to each speed shift of the speed change gear mechanism, this driven means 7 is provided with an arciform slit 24 corresponding to the desired degrees of the angle within which said means is preferably rotated; and into said arciform slit 24 is inserted a pin 25 protruded from the bottom of the casing 1.

The connection of the above-mentioned operating means and the speed change gear mechanism of a bicycle is carried out by use of an operating wire. One end of the inner wire 16 thereof connected to the mechanism is held by means of an annular channel 21 of the driven means 7, and the holding means 28 secured to the forward end of said annular channel 21 is inserted into the hole 29 provided on the driven means 7 while one end of the outer wire 26 is held in the sidewall of the casing 1. For the purpose of shifting the speed change gear mechanism the rotary means 4 is moved by operating the knob 5 with the finger tip of the hand grasping the grip B of the handle rod A. Then the movement force of the drive means 5 is transmitted as far as the driven means 7 through the engaged cogwheel teeth 4' and 7' so as to move said driven means 7, thereby shifting the speed of a bicycle through means of the inner wire 16 connected to said driven means 7. In synchronism with the movement of this driven means 7, the disc plate 8 is also moved. Thus along with the movement of this disc plate 8, the arrow marked thereon is moved to indicate the changed speed of the bicycle.

According to the speed change gear mechanism of the invention constructed in the above-mentioned manner, it is possible to shift the speed through the driven means by operating the handle means with the finger tip of the hand grasping the handle grip so as to move the drive means. In other words, it is possible to shift the speed change gear is safety without releasing the rider's grasp of the handle grip while at the same time operating the speed shift in a place different from where there is the handle grip, thereby eliminating the usual hazard that the speed is unexpectedly changed against a rider's own will. Furthermore, this shift of the speed being operated by moving the driven means through the engagement of the cogwheel teeth, it is possible to optionally select the radius of the wire reel of the driven means or the annular channel portion shown in the drawing thereby to secure the advantage that the speed shift operation can be carried out smoothly and easily. As various changes and modification could be made in the above-mentioned constructions and methods without departing from the purview of the invention, it is intended that all matters contained in the above description or shown in the accompanying drawing shall be interpreted as merely illustrating and not in a limiting sense.

I claim:

1. A hand control device for a speed change gear mechanism for a bicycle with the device arranged to be mounted on the handle bar of the bicycle adjacent a hand grip on the handle bar, wherein the improvement comprises a drive means, holder means arranged to mount said drive means on the handle bar so that said drive means is rotatable about the axis of the handle bar, said drive member including a knob arranged to extend outwardly from the handle bar so that it is accessible for rotating said drive member from the hand grip on the handle bar, a driven member mechanically interengaged with said drive member for rotation about an axis angularly intersecting the axis of rotation of said drive member, and a wire secured to said driven member and movable therewith when said driven member is rotated by said drive member and said wire extending from said driven member for operating the speed change gear mechanism.

2. A hand control device for a speed change gear mechanism for a bicycle with the device arranged to be mounted on the handle bar of the bicycle adjacent a hand grip on the handle bar, wherein the improvement comprises a drive member, cogwheel teeth formed in the circumferential periphery of said drive member, said drive member including a knob arranged to extend outwardly from the handle bar so that it is accessible for rotating said drive member from the hand grip on the handle bar, holder means arranged to mount said drive member on the handle bar so that said drive member is rotatable about the axis of the handle bar, a driven member arranged to be mounted on the handle bar for rotation about an axis intersecting the axis of said drive member and said driven member having cogwheel teeth formed in the circumferential periphery thereof, said cogwheel teeth on said driven member being in interengagement with said cogwheel teeth on said drive member for transferring rotatable motion from said drive member to said driven member, and a wire secured to said driven member and being movable therewith, said wire extending from said driven member for operating the speed change gear mechanism.

3. A hand control device, as set forth in claim 2, characterized in that said holder means comprises a first handle bar holder and a second handle bar holder, said first and second handle bar holders being shaped to fit about and closely engage the handle bar, and connecting means for securing said first and second handle bar holders together and for securing said holding means on the handle bar.

4. A hand control device for a speed change gear mechanism for a bicycle with the device arranged to be mounted on the handle bar of the bicycle adjacent a hand grip on the handle bar, wherein the improvement comprises a drive member, holder means arranged to mount said drive member on the handle bar so that said drive member is rotatable about the axis of the handle bar, said drive member including a knob arranged to extend outwardly from the handle bar so that it is accessible for rotating said drive member from the hand grip on the handle bar, a casing secured to said holder means, a shaft located within said casing, a drive member rotatably mounted on said shaft, a speed indicating disk plate located on said driven member, said casing comprising a cover plate covering said speed indicating disk plate, and said cover plate having an opening for viewing said disk plate, and said cover plate having indicator marks thereon along the opening therethrough for indicating the speed changes effected by the speed change gear mechanism, and a wire secured to said driven member and being displaceable when said driven member is rotated, said wire extending from said driven member for operating the speed change gear mechanism.

5. A hand control device, as set forth in claim 4, characterized in that stop means are arranged within said casing for limiting the angular rotation of said driven member.

* * * * *